UNITED STATES PATENT OFFICE.

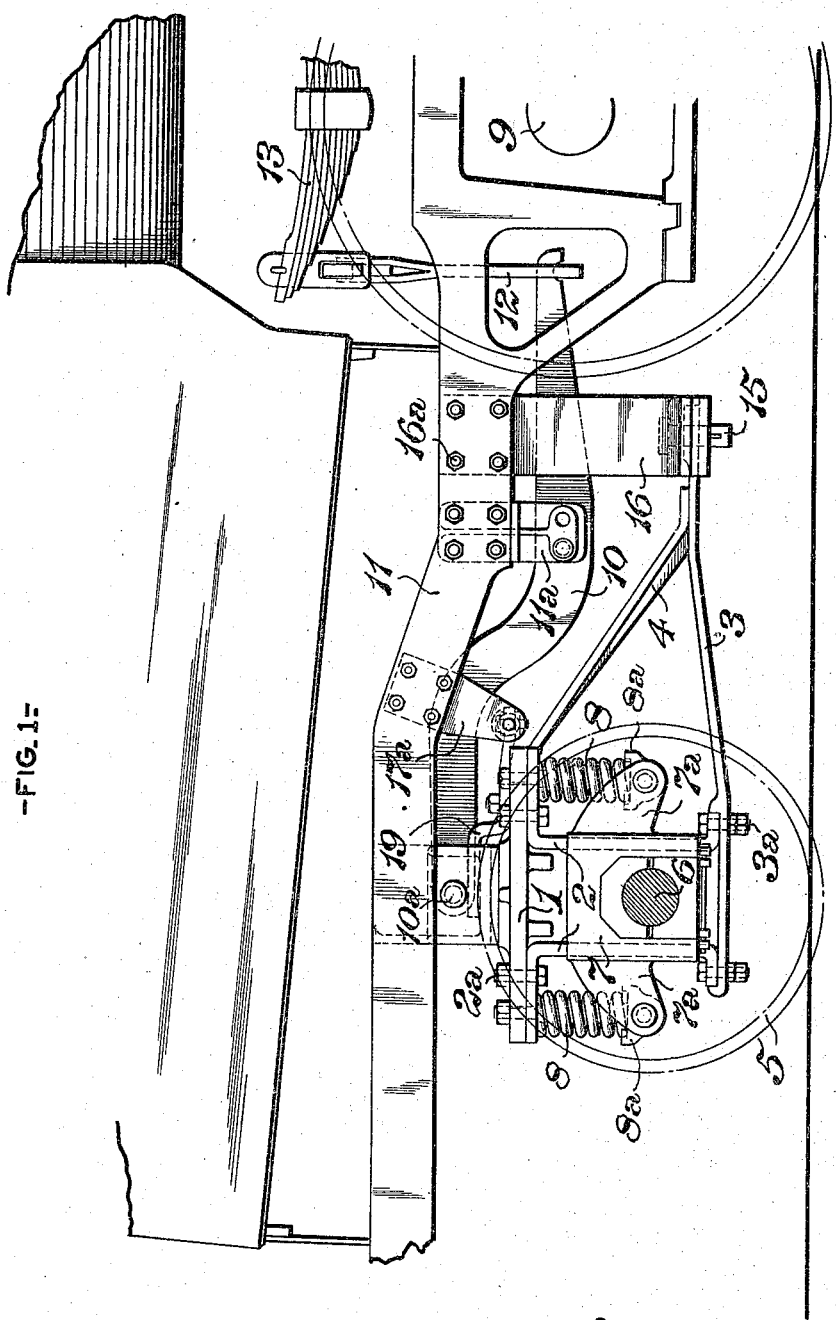

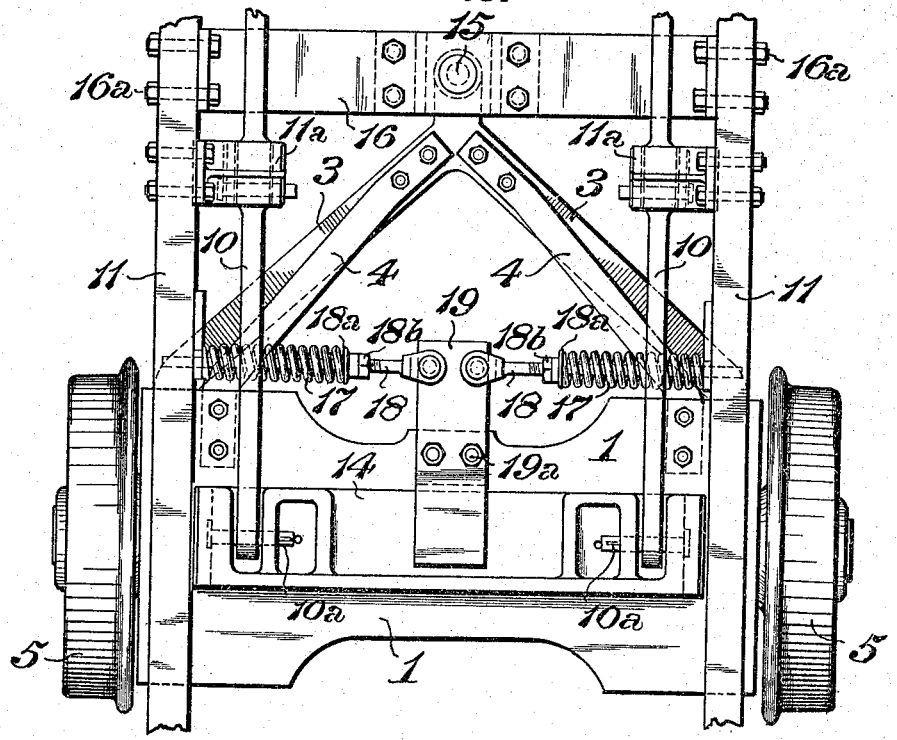
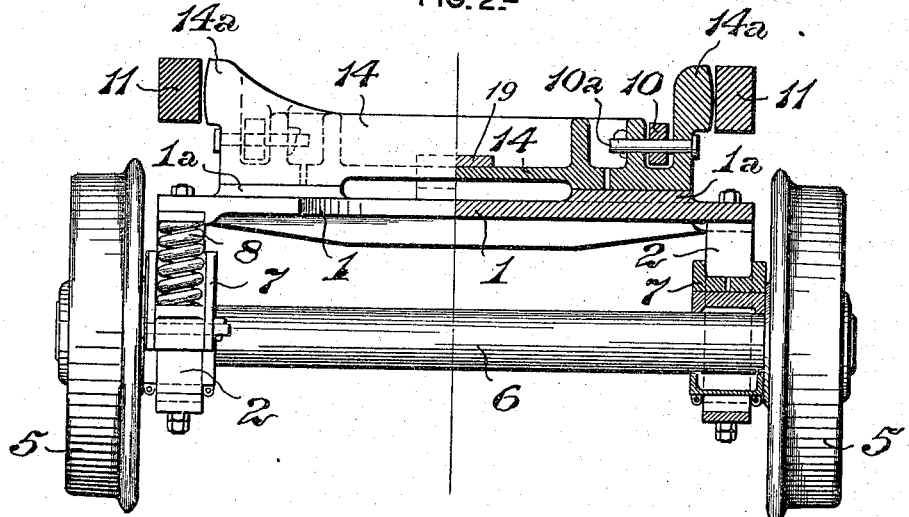

JOHN S. PAYNE, OF WORTENDYKE, NEW JERSEY.

LOCOMOTIVE-TRUCK.

1,227,192. Specification of Letters Patent. Patented May 22, 1917.

Application filed March 22, 1917. Serial No. 156,521.

*To all whom it may concern:*

Be it known that I, JOHN S. PAYNE, of Wortendyke, in the county of Bergen and State of New Jersey, have invented a certain new and useful Improvement in Locomotive-Trucks, of which improvement the following is a specification.

My invention relates to two wheeled radial leading or trailing trucks designed for supporting front or rear overhanging weight in locomotives, and its object is to provide, in a truck of such type, simplified and effective means for equalization between the driving wheels and truck, control of centering effort, and removal and replacement of the entire truck, or of parts thereof, for which substitution is required by reason of their having become worn or broken.

The improvement claimed is hereinafter fully set forth.

In the accompanying drawings: Figure 1 is a side view, in elevation, of the rear portion of a locomotive engine, illustrating an application of my invention in a trailing truck; Fig. 2, a view, the right hand half of which is a vertical transverse section through the truck, in the plane of the truck axle, and the left hand half, a rear elevation; and, Fig. 3, a plan or top view of the truck.

In the practice of my invention, referring descriptively to the specific embodiment thereof in a two wheeled radial locomotive trailing truck which is herein exemplified, the frame of the truck comprises a top transom, 1, having plane horizontal seats, 1$^a$, on its upper surface; two pairs of pedestal jaws, 2, 2, which are secured to the ends of the transom by bolts, 2$^a$; radius bars, 3, which are secured to the lower ends of the pedestal jaws by bolts, 3$^a$, and extend forwardly therefrom, and which may be either integral, in V form, as shown, or be secured together at their forward ends; and downwardly and forwardly inclined braces, 4, the upper ends of which are secured to the transom, 1, and their lower ends to the radius bars.

The truck wheels, 5, are secured upon the outer ends of an axle, 6, which rotates in journal boxes, 7, each of which is fitted, with the capacity of relative vertical movement, between the members of one of the pairs of pedestal jaws, 2. The weight borne by the truck is transmitted to the journal boxes through pairs of helical springs, 8, interposed between the upper horizontal portions of the pedestal jaws and spring seats, 8$^a$, pivoted to lateral lugs, 7$^a$, on the journal boxes.

The truck axle, 6, is equalized with the nearest driving axle, 9, by equalizing levers, 10, which are journaled in brackets, 11$^a$, depending from the side members, 11, of the locomotive frame, the forward ends of said levers being coupled to the spring hangers, 12, of the adjacent ends of the springs, 13, of the driving axle, 9. The rear ends of the equalizing levers are coupled, by pins, 10$^a$, to a bolster, 14, which rests on the seats, 1$^a$, of the transom, 1, of the truck frame, the latter sliding under the bolster in swinging transversely to the locomotive. Movement of the bolster, transversely to the locomotive, is prevented by vertical bearings, 14$^a$, on its ends, which adjoin the inner sides of the main frame members, 11.

The capacity of required radial movement of the truck relatively to the main frame of the locomotive, is afforded it by its pivotal connection to said frame by a radius bar pin, 15, which is located in the longitudinal central plane of the locomotive, and passes through an eye in the front ends of the radius bars, 3, and through a corresponding eye in the horizontal portion of a cross bearer, 16, which is of substantially U form, its vertical end portions being secured to the main frame members by bolts, 16$^a$. The truck frame is normally maintained in line with the main frame and returned to such normal relation after passing curves, by transversely extending centering springs, 17, abutting, at their outer ends, on bearings, 17$^a$, secured to the main frame members, and, at their inner ends, on washers, 18$^a$, fitted on bolts, 18, which are coupled to a guard plate, 19, secured to the truck transom, 1, by bolts, 19$^a$, and fitting over the sliding bolster, 14. The tension of the centering springs may be adjusted, as desired, by nuts, 18$^b$, engaging threads on the bolts, 18.

Among the advantages resultant upon the application of my invention, may be noted that by reason of the equalizing means which it provides, the equalizing beams can be kept well outwardly toward the journal boxes when used as a trailing truck, and the load on curves will not be greater than on straight track, there being no upwardly swinging bolster which would increase the load on truck. No center pin being used, the truck can be made low, and by removing the radius bar pin, the truck can be readily removed from the locomotive, when desired. The centering effort can be varied, as desired, by increasing or decreasing the tension of the springs, and the guard secured to transom will prevent the truck frame dropping, in case of derailment. It will be seen that the construction may, without variation of structural or operative principle, be applied either as a leading or a trailing truck, and that there is a material reduction of parts as compared with those now known in railroad service.

I claim as my invention and desire to secure by Letters Patent:

1. In a locomotive engine, the combination of a main frame; a radial truck pivoted thereto; and an equalizing system interposed between the supporting wheels of the main and truck frames and comprising equalizing levers which are pivotally connected to the main frame and supported on the truck frame free from connection thereto.

2. In a locomotive engine, the combination of a main frame; a radial truck pivoted thereto; and an equalizing system interposed between the supporting wheels of the main and truck frames and comprising equalizing levers which are pivotally connected to the main frame and mounted on the truck frame with the capacity of free transverse movement thereof, relatively to the equalizing levers.

3. In a locomotive engine, the combination of a main frame; a radial truck pivoted thereto; and an equalizing system interposed between the supporting wheels of the main and truck frames and comprising equalizing levers which are pivotally connected to the main frame, and a bolster coupled to said levers and supported freely on the truck frame.

4. In a locomotive engine, the combination of a main frame; a radial truck pivoted thereto; equalizing levers pivotally connected to the main frame; a bolster coupled to said levers and supported freely on the truck frame; and means for preventing movement of said bolster transversely to the truck frame.

5. In a locomotive engine, the combination of a main frame; a radial truck pivoted thereto; equalizing levers pivotally connected to the main frame; a bolster coupled to said levers and supported freely on the truck frame; and means for preventing vertical movement of said bolster, relatively to the truck frame.

6. In a locomotive engine, the combination of a main frame; a radial truck pivoted thereto; equalizing levers pivotally connected to the main frame; a bolster coupled to said levers and supported freely on the truck frame; and a guard plate secured to the truck frame and fitting over the bolster.

7. In a locomotive engine, the combination of a main frame; a radial truck pivoted thereto; equalizing levers pivotally connected to the main frame; a bolster coupled to said levers and supported freely on the truck frame; a guard plate secured to the truck frame and fitting over the bolster; and centering springs bearing on said guard plate and on the main frame.

8. In a locomotive truck, the combination of a top transom having bolster seats on its upper side, pairs of pedestal jaws secured to the ends of said transoms, radius bars connected, at their rear ends, to the bottoms of the pedestal jaws and connected, one to the other, at their front ends, and braces connecting the tops of the pedestal jaws with the radius bars.

JOHN S. PAYNE.

Witnesses:
C. B. HARBISON,
W. H. HARRISON.